United States Patent
Kaler et al.

(10) Patent No.: US 9,432,278 B2
(45) Date of Patent: Aug. 30, 2016

(54) SIMULATION OF INTERACTIONS BETWEEN NETWORK ENDPOINTS

(71) Applicant: Microsoft Corporation, Redmond, WA (US)

(72) Inventors: Christopher G. Kaler, Sammamish, WA (US); Ning Sun, Redmond, WA (US); Yiming Cao, Redmond, WA (US); Meng Jin, Redmond, WA (US); Nicolas Kicillof, Redmond, WA (US); Sergio F. Mera, Bellevue, WA (US); Andrey Arkharov, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 468 days.

(21) Appl. No.: 13/787,808

(22) Filed: Mar. 7, 2013

(65) Prior Publication Data

US 2014/0258779 A1   Sep. 11, 2014

(51) Int. Cl.
*G06F 17/27* (2006.01)
*G06F 17/30* (2006.01)
*G06F 17/50* (2006.01)
*H04L 12/26* (2006.01)
*H04L 29/06* (2006.01)
*G06F 21/55* (2013.01)

(52) U.S. Cl.
CPC ............. *H04L 43/50* (2013.01); *G06F 21/552* (2013.01); *H04L 43/18* (2013.01); *H04L 63/1408* (2013.01); *H04L 63/1433* (2013.01)

(58) Field of Classification Search
CPC .......... G06F 17/50; G06F 9/44; G06F 15/16; G06F 13/28
See application file for complete search history.

(56) References Cited

U.S. PATENT DOCUMENTS

| | | | | |
|---|---|---|---|---|
| 4,468,756 A * | 8/1984 | Chan | | 704/4 |
| 4,931,935 A * | 6/1990 | Ohira et al. | | 704/8 |
| 5,440,719 A * | 8/1995 | Hanes | | G06F 11/3447 703/21 |
| 5,768,603 A * | 6/1998 | Brown et al. | | 704/9 |
| 5,809,269 A * | 9/1998 | Favot et al. | | 712/200 |
| 5,916,305 A * | 6/1999 | Sikdar | | G06F 17/2705 709/230 |
| 6,122,757 A * | 9/2000 | Kelley | | H04L 43/18 707/999.006 |
| 6,304,903 B1 | 10/2001 | Ward | | |
| 6,477,580 B1 * | 11/2002 | Bowman-Amuah | | G06F 9/54 709/231 |
| 6,665,725 B1 * | 12/2003 | Dietz | | G06F 17/30985 370/389 |

(Continued)

OTHER PUBLICATIONS

Borisov, et al., "Generic Application-Level Protocol Analyzer and its Language", Retrieved at <<http://research.microsoft.com/en-us/um/people/helenw/papers/2005-133.pdf>>, In Proceedings of the 14th Annual Network & Distributed System Security Symposium, Feb. 28, 2007, pp. 1-15.

(Continued)

*Primary Examiner* — Chat Do
*Assistant Examiner* — Devayani R Talukdar
(74) *Attorney, Agent, or Firm* — Henry Gabryjelski; Kate Drakos; Micky Minhas (57) ABSTRACT

Descriptions of communication interactions can be used to create a simulation of actual systems that send and receive communications including but not limited to messages complying with a protocol, events and so on. The communication interaction, event, state and state transitions of protocol or software components can be modeled to determine outcome and to validate the format and semantics of events, interaction values, etc. to identify variances against established policies or architectural guidelines.

20 Claims, 6 Drawing Sheets

(56) References Cited

U.S. PATENT DOCUMENTS

| | | | |
|---|---|---|---|
| 6,931,574 B1* | 8/2005 | Coupal | H04L 43/18 709/230 |
| 7,200,602 B2* | 4/2007 | Jonas | G06F 17/30578 |
| 7,308,715 B2 | 12/2007 | Gupta et al. | |
| 7,415,596 B2* | 8/2008 | Sikdar | G06F 8/427 712/200 |
| 7,478,223 B2* | 1/2009 | Sikdar | G06F 8/427 712/200 |
| 7,634,557 B2 | 12/2009 | Moore et al. | |
| 7,802,025 B2* | 9/2010 | Chen | G06F 15/163 706/42 |
| 7,975,059 B2 | 7/2011 | Wang et al. | |
| 8,117,233 B2* | 2/2012 | Liu | G06Q 10/10 707/608 |
| 8,261,340 B2* | 9/2012 | Chauhan | H04L 63/0227 726/12 |
| 8,631,499 B2* | 1/2014 | Guruswamy | G06F 21/577 709/224 |
| 2005/0251382 A1* | 11/2005 | Chang | G06F 8/20 704/9 |
| 2007/0140295 A1 | 6/2007 | Akaboshi | |
| 2008/0120400 A1* | 5/2008 | Keller | G06Q 10/06 709/223 |
| 2008/0243801 A1* | 10/2008 | Todhunter | 707/4 |
| 2008/0313208 A1* | 12/2008 | Hourselt | G06F 8/73 |
| 2009/0282388 A1* | 11/2009 | Gawor | G06F 8/71 717/120 |
| 2010/0017185 A1* | 1/2010 | Bade | G06F 17/5022 703/13 |

OTHER PUBLICATIONS

Won Dracek, et al., "Automatic Network Protocol Analysis", Retrieved at <<http://seclab.tuwien.ac.at/people/pmilani/ndss08-anpa.pdf>>, In Proceedings of the 15th Annual Network and Distributed System Security Symposium, Feb. 2008, pp. 1-18.

* cited by examiner

SIMULATION OF INTERACTIONS BETWEEN NETWORK ENDPOINTS

BACKGROUND

A packet analyzer (also known as a network analyzer, protocol parser, protocol analyzer or packet sniffer) is software or hardware that can intercept and log traffic traveling over a network. As data flows across the network, the packet analyzer can capture packets. If the content of the packet is encoded, the packet analyzer can decode the encoded data and display the values of various fields in the packet.

Some known packet analyzers can capture, view and display network data and can decipher network protocols. Users can interactively browse the data traffic on a computer network using a graphical user interface (GUI) that can filter and organize the data. Two common software-based packet analyzers are Microsoft Network Monitor and Wireshark.

SUMMARY

Source code written in a domain-specific programming language can be used to specify valid and/or invalid interactions between communicating entities. The source code can specify valid and/or invalid formats for the communications. The source code can specify valid and/or invalid fields in a communication. The source code can specify valid and/or invalid types of data for each field in the communication. The source code can specify valid and/or invalid values for each field. The source code can specify constraints placed on the data in the fields of the communication. The source code can specify combinations of constraints placed on multiple fields. The source code can specify valid and/or invalid sequences of communications. The source code can specify valid and/or invalid processing semantics of the fields of the communications. The source code can specify valid and/or invalid patterns in a series of communications. The source code can specify how the communication is placed into the communication mechanism.

The source code can be received by a communication analyzer generator. The communication analyzer generator can create a communication analyzer based on the directives received in the source code. The directives received in the source code can cause the generation of a communication analyzer that simulates interactions between entities in the real world. The communication analyzer can capture live communications from entities. The communication analyzer can capture logged communications from entities. The communication analyzer can generate communications similar to communications sent from one or more sending entities. The communication analyzer can generate communications similar to communications received by one or more receiving entities. The communication analyzer can create a facsimile of one or more sending entities. The communication analyzer can create a facsimile of one or more receiving entities. The communication analyzer can use the facsimiles of the sending and receiving entities to create a simulation that simulates real world interactions between entities.

The communication analyzer can compare communication interactions between entities with model communication interactions between facsimiles of the entities. The communication analyzer can adjust the state of the facsimiles of the sending and receiving entities to simulate processing performed by the real world sending and receiving entities. The communication analyzer can perform validation of fields, validation of state of the facsimiles of entities and/or validation of sequences of fields or sequences of communications using model communication interactions. The communication analyzer can check state transitions of the facsimiles of the sending and receiving entities to determine compliance or non-compliance with model state transitions as specified by the source code.

The communication analyzer can determine if the communications comply with model communications as specified by the source code. The communication analyzer can determine if the interactions between the sending and receiving entities comply with model communication interactions as specified in the source code. Because the source code controls the degree to which communication interactions are compared to model communication interactions, a user can control to what degree of specificity communication interactions between the facsimiles are checked against model communication interactions by the specificity of the directives in the source code provided to the communication analyzer generator from which the communication analyzer is created. A user can extend an existing communication analyzer by extending existing model communication interactions by for example but not by way of limitation, creating derivatives of objects of the existing communication analyzer.

Information provided by the communication analyzer can be results of a comparison of communications between entities with model communication interactions between facsimiles of entities. Results can be displayed on a display device, provided in tangible form or in any suitable form. Information associated with compliance or non-compliance of communication interactions with model communication interactions can be provided by the communication analyzer. Information provided by the communication analyzer can be diagnostic information including but not limited to configuration information based on observed communications by matching a sequence of communication interactions to a defined set of patterns. Information provided by the communication analyzer can indicate that a communication is correct or incorrect, that sequencing of communications are correct or incorrect, that constraints on the communication content or processing semantics are violated or complied with. Information provided by the communication analyzer can identify a particular field that complies with or does not comply with model structure or content. The communication analyzer can report the state of fields, communications or processing state of a facsimile of an entity.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

A domain-specific language can be used to model communications. Validation processing that previously had to be hard-coded into a protocol parser can be declaratively provided using source code in the domain-specific language. In accordance with some aspects of the subject matter described herein, the source code can be compiled into C# source code that is input to a C# compiler. Communications can be messages that comply with a protocol, events (e.g. notifications), interactions between one or more parties, interactions between one or more components in the same or different processes on the same or different computing devices and so on. A communication analyzer can be generated by a communication analyzer generator as directed by the source code written in the domain-specific language.

The communication analyzer can perform static checks and can diagnose errors and/or particular conditions in communications and in the relationships between entities. The communication analyzer can be a diagnostic tool. Communications can be captured from real world systems or can be generated. Communications captured can be live or previously recorded (e.g., communications persisted in logfiles can be captured). Actual processing of real world systems can be simulated by the communication analyzer. Facsimiles of communicating entities can be constructed by the communication analyzer. The facsimiles can be used to represent and simulate communications between communication endpoints. For example, client and server side facsimiles can simulate communication interactions between network endpoints. As the simulation occurs, validation semantics can be applied on the static data as well as on the sequencing of and patterns within the communications. Patterns can be patterns comprised of patterns.

Information can be lazily processed by the communication analyzer. For example, a TCP packet includes a number of fields, however, all of them may not be needed for the simulation. The values of these fields can be considered unknown until needed for validation or display. The location of a field not needed for the simulation can be determined but the value may not be obtained until needed. Patterns of communications can be described more or less exactly. A set of patterns can be defined and provided to the communication analyzer for comparison with sets of communications. A group of communications satisfying a particular condition can be processed or a single communication can be examined. Potential error conditions and/or conditions of interest can be determined. Logs including but not limited to event logs, system logs, error logs and/or application logs can be analyzed. Pattern matching and sequence validation can correlate logs from multiple data sources and can identify potential errors and/or conditions of interest. Doing so may assist users to quickly narrow down areas to troubleshoot before manual investigation. Errors can be determined programmatically by the communication analyzer without human inspection or analysis. Communications can be generated by the communication analyzer, enabling the communication analyzer to be used for testing.

Traditionally, if a new protocol is created that is based on an existing protocol, the existing protocol parser has to be modified to add processing to hand off a communication to the new protocol, when indicated. For example, suppose a new protocol based on the Ethernet protocol is created. In order to correctly process a message created in accordance with the new protocol, the Ethernet protocol parser has to be modified to know where to send the message. In contrast, in accordance with aspects of the subject matter disclosed herein, a contract between the existing protocol and the new protocol is established. The existing protocol parser processes the message and the new protocol parser takes the processed message and performs whatever new processing is involved, in accordance with the contract. The existing protocol parser does not need to be changed.

Multiple logical queues can represent each endpoint (including but not limited to client and server side endpoints). When a communication is intercepted, it is typically intercepted at a known point. A logical queue can be created for each point. The intercepted communication can be placed in an inbound queue associated with that point. For example, suppose a TCP (Transmission Control Protocol) message bound for Ethernet port B is intercepted at Ethernet port A. The message can be placed into a queue for Ethernet port A. The communication analyzer can get the message from the queue for the sender Ethernet port A, determine that it is an Ethernet message, process it in accordance with the Ethernet protocol as specified in the source code from which the communication analyzer was created and can move the message to the queue associated with Ethernet port B.

In the case of layered protocols, as the message is processed by one protocol, the message can be moved to the next layer of the protocol (e.g., the Ethernet message can be processed and placed in a queue associated with the IP (Internet Protocol) protocol layer parser. For example, suppose an Ethernet message arrives at an Ethernet address. The message can be processed and handed to an IP address. The message can be processed and handed to a TCP port. The message can be processed and handed to a HTTP (Hypertext Transfer Protocol) URL (Uniform Resource Locator). Because objects created for receiving messages can have a uniform shape, a centralized queue can be used to represent multiple logical queues. Messages can be processed both from the client side and the server side and can be passed between protocol layers using the endpoints.

Traditionally, protocol parsers start from a known point. For example, known network protocol parsers intercept a packet from the network at the Ethernet layer and process the message up the various layers (IP, TCP, HTTP). A consequence of this processing model is that to get to the message or messages of interest a large number of messages have to be processed. Moreover, some of the layers (such as IP and HTTP) can be encrypted. Decryption keys are often inaccessible, making analysis of encrypted layers problematic or impossible. Finally, the messages at the IP, TCP, and HTTP layers can be fragmented, reassembled and retransmitted in a different order. In accordance with aspects of the subject matter described herein, difficulties associated with numbers of messages, encryption and packet reassembly can be avoided. Because of the existence of contracts between each layer of the layered protocol, a message can be processed starting at any layer. Messages can be captured at the network (Ethernet) layer or at the firewall layer (TCP layer) or at the HTTP proxy (HTTP layer). The TCP layer is above network encryption. The HTTP proxy layer is above HTTP encryption. By capturing at the HTTP proxy, encryption at all levels and packet reassembly can be avoided. The messages that are processed can be filtered to only those messages between endpoints of interest, and the messages are not encrypted and are in order.

The processing described can be implemented in various ways. One way is to compile and analyze the domain-specific language source code and generate parser code automatically. Type checking can be performed using a queuing infrastructure. The generated parser code can perform validation and sequencing checks on the communication data. The compilation process can perform static checks. Pattern analysis can be performed by compiling the patterns to finite-state machines (FSMs) and processing the incoming messages either synchronously or in parallel. Patterns can be recursively combined to create new "virtual messages" or "operations" which can be further composed.

Communication Analyzer

Figure 1A:
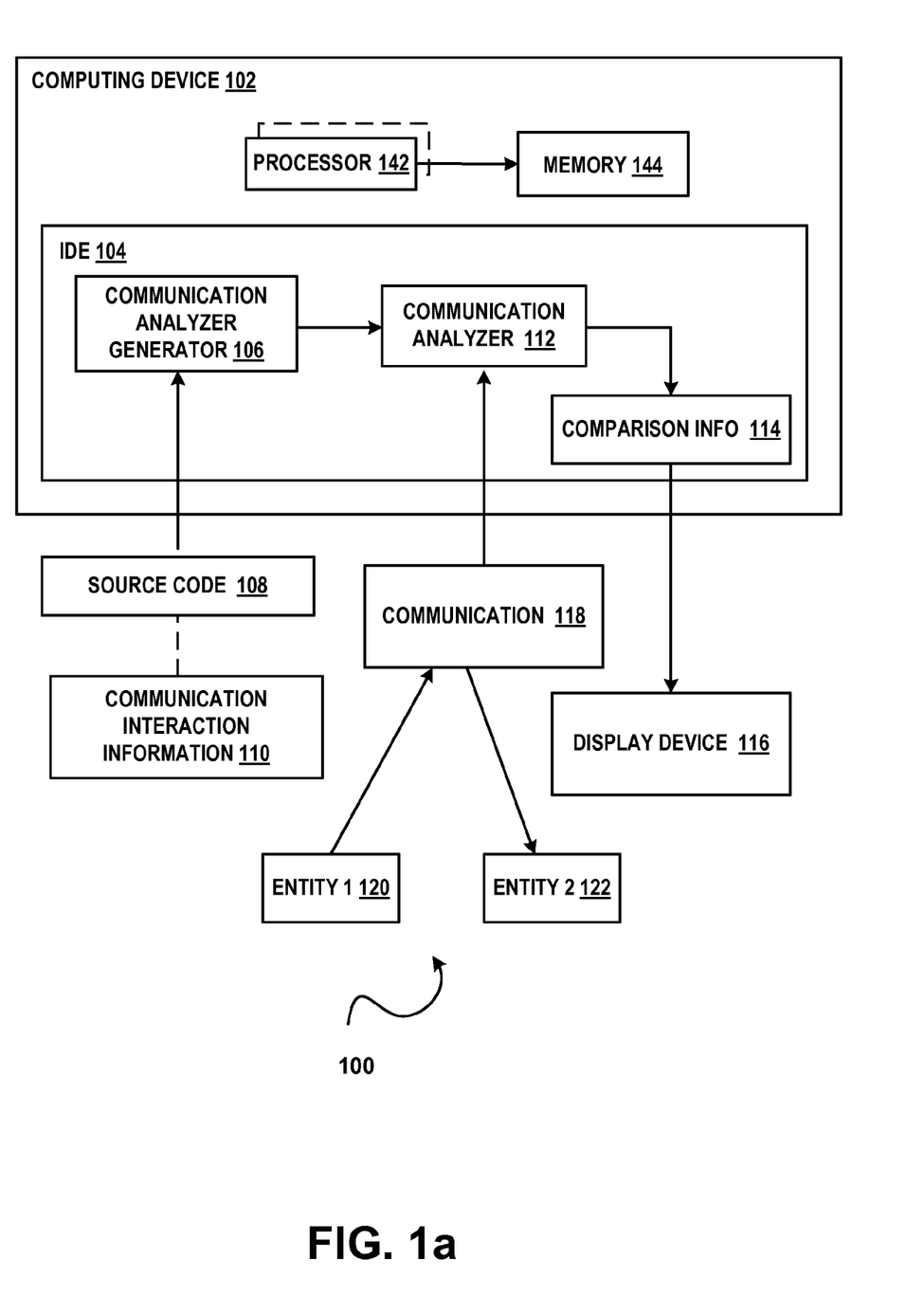
FIG. 1a is a block diagram that illustrates an example of a system 100 that can analyze communications in accordance with aspects of the subject matter described herein.

FIG. 1a illustrates a block diagram of an example of a system 100 in accordance with aspects of the subject matter described herein. All or portions of system 100 may reside on one or more computers or computing devices such as the computers described below with respect to FIG. 3. System 100 or portions thereof may be provided as a stand-alone system or as a plug-in or add-in. System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud. System 100 may execute in whole or in part on a software development computer such as the software development computer described with respect to FIG. 4. All or portions of system 100 may be operated upon by program development tools. For example, all or portions of system 100 may execute within an integrated development environment (IDE) such as for example IDE 104. IDE 104 may be an IDE as described more fully with respect to FIG. 4 or can be another IDE. System 100 can execute wholly or partially outside an IDE.

System 100 can include one or more computing devices such as, for example, computing device 102. A computing device such as computing device 102 can include one or more processors such as processor 142, etc. and a memory such as memory 144 connected to the one or more processors. Computing device 102 can include one or more modules comprising a communication analyzer generator such as communication analyzer generator 106. Communication analyzer generator 106 can receive source code such as source code 108. In response to receiving source code 108, communication analyzer generator 106 can generate a communication analyzer such as communication analyzer 112. Communication analyzer 112 can receive one or more communications such as communication 118, etc. and can produce information resulting from a comparison of communication interactions with model communication interactions (e.g., comparison information 114). Comparison information 114 can be displayed on a display device such as display device 116. Display device 116 can be a screen, monitor, printer or any device on which results can be provided. Other components well known in the arts may also be included but are not here shown.

It will be appreciated that the one or more modules such as, by way of example but not limitation, modules comprising a communication analyzer that analyzes communications, etc. as described herein, can be loaded into memory 144 to cause one or more processors such as processor 142, etc. to perform the actions attributed to the one or more modules that analyze communications.

Communication analyzer generator 106 can be a compiler. A compiler may be a computer program or set of programs that translates text written in a (typically high-level) programming language into another (typically lower-level) computer language (the target language). The output of the compiler may be object code. Typically the output is in a form suitable for processing by other programs (e.g., a linker), but the output may be a human-readable text file. Source code is typically compiled to create an executable program but may be processed by program development tools which may include tools such as editors, beautifiers, static analysis tools, refactoring tools and others that operate in background or foreground.

A compiler may comprise a .NET compiler that compiles source code written in a .NET language to intermediate byte code. .NET languages include but are not limited to C#, C++, F#, J#, JScript.NET, Managed Jscript, IronPython, IronRuby, VBx, VB.NET, Windows PowerShell, A#, Boo, Cobra, Chrome (Object Pascal for .NET, not the Google browser), Component Pascal, IKVM.NET, IronLisp, L#, Lexico, Mondrian, Nemerle, P#, Phalanger, Phrogram, PowerBuilder, #Smalltalk, AVR.NET, Active Oberon, APLNext, Common Larceny, Delphi.NET, Delta Forth .NET, DotLisp, EiffelEnvision, Fortran .NET, Gardens Point Modula-2/CLR, Haskell for .NET, Haskell.net, Hugs for .NET, IronScheme, LOLCode.NET, Mercury on .NET, Net Express, NetCOBOL, OxygenScheme, S#, sml.net, Wildcat Cobol, X# or any other .NET language. A compiler may comprise a JAVA compiler that compiles source code written in JAVA to byte code. A compiler can be any compiler for any programming language including but not limited to Ada, ALGOL, SMALL Machine Algol Like Language, Ateji PX, BASIC, BCPL, C, C++, CLIPPER 5.3, C#, CLEO, CLush, COBOL, Cobra, Common Lisp, Corn, Curl, D, DASL, Delphi, DIBOL, Dylan, dylan.NET, eC (Ecere C), Eiffel, Sather, Ubercode, eLisp Emacs Lisp, Erlang, Factor, Fancy, Formula One, Forth, Fortran, Go, Groovy, Haskell, Harbour, Java, JOVIAL, LabVIEW, Nemerle, Obix, Objective-C, Pascal, Plus, ppC++, RPG, Scheme, Smalltalk, ML, Standard ML, Alice, OCaml, Turing, Urq, Vala, Visual Basic, Visual FoxPro, Visual Prolog, WinDev, X++, XL, and/or Z++. Compiler 108 can be a compiler for any typed programming language.

Communication analyzer generator 106 can be an interpreter. An interpreter can be a program which interprets and executes source code line by line. An interpreter typically execute source code directly, translating the source code into an intermediate representation and immediately execute the intermediate representation. Often an interpreter explicitly executes stored precompiled code generated by a compiler.

Source code 108 can be source code written in a domain-specific language. Source code 108 can be written in any constrained programming language. Source code 108 can describe communication interactions between entities such as entity 1 120 and entity 2 122. Source code 108 can describe an entity that generates a communication, an entity that sends a communication, an entity that receives a communication, an event, an event handler, a protocol, a function, an error condition, a performance or usage metric, or any data. Source code 108 can describe the data that can be communicated, the way that the data is communicated, to whom the data is sent, from whom the data is received, and so on. Source code 108 can describe the format of a communication. Source code 108 can describe formatting constraints for the communication interaction. Source code 108 can describe the type or abstract form of valid data (e.g., the data is an integer or the data is a string). For example, source code can indicate that a valid first field of a particular communication is sixteen characters long, represents a credit card number; and that all sixteen characters have to be numeric. Source code 108 can describe invalid types and abstract forms of data.

Source code 108 can describe semantic constraints upon the data. For example, a valid credit card number for a particular credit card company may conform to certain semantic rules, e.g., the first four numbers of a valid credit card number for credit card company A starts with numbers in the range of "9991" to "9999" and so on). The logic represented by source code 108 can be complex. For example, source code 108 may specify that if field one equals six and field two equals five then field three has to equal twelve or be greater than seven, or the like. Source code 108 can describe sequencing constraints such as, by way of example but not limitation, a file cannot be closed before the file is opened. Source code 108 can describe sequencing rules. The sequencing rules specified in source code 108 can describe patterns comprising valid sequences. The sequencing rules can describe patterns comprising invalid sequences. By way of example and not limitation, an invalid pattern can be a write instruction that occurs before a read instruction, Other instructions may be interposed between the sequenced instructions. The pattern described can be as generic or as specific as desired. Patterns can be described that indicate that certain combinations of values are valid within one step or across several steps in a sequence. Patterns can be described that indicate that certain combinations of values are invalid within one step or across several steps in a sequence. Common errors may be known and a pattern describing the common error can be created to facilitate rapid diagnosis of the error condition, even if, for example, structurally the fields in the message are correct.

Source code 108 can describe model rules for the communication interaction. Source code 108 can describe violations of the model rules for the communication interaction. Source code 108 can describe how to decompose a communication into its parts. Source code 108 can describe how a communication is assembled. Source code 108 can describe how to generate a communication. The degree to which communications are analyzed and validated can depend on the degree of detail provided by the statements describing valid or invalid communications. Source code 108 can describe aspects of valid and invalid communications between the entities.

Source code 108 can be based on communication interaction information such as communication interaction information 110. Communication interaction information can be information provided from a standards body for a standardized protocol, such as the Ethernet protocol, IP protocol, TCP protocol, HTTP protocol or any other standardized or unstandardized protocol. Valid and invalid communications between the entities may be described in an informal protocol, in documentation or can be described in any way. Valid and invalid communications between the entities can be deduced from executing programs or in any way.

The communication analyzer 112 can simulate a communication paradigm, protocol or other communication system. The communication analyzer 112 can receive one or more communications such as communication 118, etc. The communication analyzer can generate one or more communications such as communication 118, etc. The communication analyzer 112 can decompose the communication into components such as fields. The communication analyzer 112 can perform formatting validation processing on the fields. The communication analyzer 112 can perform semantic validation processing on the fields. The communication analyzer 112 can determine if any of the constraints of the model as specified by source code 108 are violated. The communication analyzer can perform pattern matching against a set of defined patterns as described above.

The communication analyzer can perform static analysis such as static type checking including but not limited to closure and completion semantics. The communication analyzer can determine if a particular communication will reach a predetermined state. Traditional protocol parsers typically are unable to perform these tasks because traditional protocol parsers define protocols in text or in C code or in display language and are unable to perform semantic validation. By creating a separate language that has semantics processing capabilities and by using state machines static analysis of the model as represented by the source code 108 semantic analysis can be performed. The communication analyzer can validate a communication interaction against a model communication interaction as represented by the source code 108 by creating a simulation or facsimile of the model. The level of detail of the facsimile created can be controlled. A facsimile can be an abstract representation of the model or an exact or very detailed model of state or anywhere in between. The communication analyzer can be extended by adding derivative model communication interactions in the domain-specific language which can perform further simulation, diagnostic analysis, and range checking. Enabling extension of the communications analyzer enables third parties to extend rules modeled by the communication analyzer. In accordance with some aspects of the subject matter disclosed herein the communication analyzer can be extended by creating derivative objects.

The communication analyzer 112 can simulate the behavior of the sender of one or more communications such as communication 118, etc. A communication 118 can be a message sent over a network, an event sent to a software component, an event sent to a logfile, a status event, a diagnostic event, a combination thereof or any kind of communication. For example, error logs, system logs, application logs, or event logs of a system can be used to simulate state transitions of the system, and can be used to infer the root cause of errors based on the simulation. The communication analyzer 112 can simulate the behavior of the receiver of one or more communications such as communication 118, etc. The communication analyzer can build high-level communications out of lower-level ones to present a more succinct view of a sequence. For example, an HTTP GET command followed by an HTTP response can be combined as a HTTP Get Operation to simplify analysis. Similarly, a File Open followed by multiple File Writes followed by a File Close can be combined as a File-Copy-Operation. The instructions can further compose patterns of operations, events, communications, messages, and mixtures thereof. A sender of the communication can be a server or a client. A receiver of the communication can be a client or a server. The communication analyzer 112 can manipulate state and check state transitions to model one or more communications systems.

The communication analyzer 112 can analyze communications such as communications 118, etc. The communication analyzer 112 can diagnose errors in communications such as communications 118, etc. Comparison information such as comparison information 114 can be generated and can be displayed on a display device such as display device 116. Comparison information 114 can be diagnostic information and can include communication errors, information comprising state information associated with the simulation, trace information, etc. Display device 116 can be a screen, a printer, or any suitable device that can provide a visual, human or machine-readable version of comparison information 114. Comparison information 114 can be written to a computer-readable storage medium whose contents can be displayed.

Communication 118, etc. can be a communication sent from one entity to another entity. Entities such as entity 1 120 and entity 2 122 can be endpoints of messages sent over a network, (e.g., one endpoint such as entity 1 120 can be the sender of the message and the other endpoint such as entity 2 122 can be the receiver of the message). Entities can be communicating parties. Entities can be software components executing on a computer. Entities can be endpoints on virtual machines. Entities can be endpoints on virtual networks. Entities can be endpoints on virtual buses. Entities can communicate using shared memory, private channels, a virtual network, a virtual bus, etc. A virtual network can be described as a computer network that includes virtual network links. A virtual network link is a link that does not comprise of a physical (wired or wireless) connection between two computing devices but is implemented using methods of network virtualization. A virtual bus is software that simulates a bus. Entities may communicate via a protocol, including but not limited to a network protocol such as Ethernet, IP, TCP or HTTP, a local protocol or any other protocol. Entities may communicate via events, messages, functions or in any way. Entities may communicate via a local or public network, via virtualized networks, busses, virtual busses or by any means. Entities may communicate via a protocol associated with a local or public network, virtualized networks, busses, virtual busses, etc. The communication analyzer can analyze communications comprising a packet sent over a network, a message sent between interacting parties, an event sent between software components or any other communication. Entities can signal events or conditions. Communications between entities can comprise any data including but not limited to logging or tracing information in which information about a program's execution (e.g., recording information associated with "Initializing", "Start Processing" and "End Processing" is recorded).

By way of example but not limitation, suppose a communication comprising one or more packets of a message is intercepted from a network. Suppose the packet is received by a communication analyzer as described herein. The communication analyzer can determine that the communication is a TCP message that is sent by party A (a client) to party B (a server). The communication analyzer can construct a logical facsimile of the server. The communication analyzer can construct a logical facsimile of the client. When executing the facsimile of the server and the client, the communication analyzer can model an actual interaction between server and client. The model can process the message to determine what happens in response to the server sending the message and the client receiving the message.

The communication analyzer can modify the state of the logical facsimile of the server as specified by the instructions of the source code used to create the communication analyzer. The communication analyzer 112 can check state transitions at the facsimile of the server. Similarly, the communication analyzer can provide the message to the logical facsimile of the client, adjusting its state as specified by the source code instructions used to create the communication analyzer. The communication analyzer 112 can check state transitions at the facsimile of the client. Errors in the communication can be detected. Errors in the communication can be provided in tangible form to a user.

For example, suppose a file server receives communications from third parties. Suppose that communication suddenly fails between the file server and one of the third parties. Network messages from the third party can be provided to the communication analyzer. The communication analyzer can determine why the communication failed. Suppose for example, the communication failed because a particular field in the message did not conform to the specification for that field. The network messages from the third party can be analyzed both structurally and semantically. Comparison information comprising diagnostic information such as for example, the name of the field, the location of the field in the message, the content of the field and an error message describing what is wrong with the field can be displayed on the display device.

When a message is received, traditional packet analyzers create a structure in memory and decompose all the parts of the message. Each part of the message is typically decoded and the structure in memory is filled in with the content of the message. In contrast, in accordance with aspects of the subject matter described herein, parts of the message can be processed lazily as needed. That is, the processing involved in analyzing a field can be delayed until the value of the field is needed. For example, suppose one of the fields in a message is base 64 encoded. Decoding a base 64 field is relatively expensive in terms of processing power. Instead of decoding the field immediately the communication analyzer may instead note that a base 64 encoded field is located at a particular byte position in the message for a particular length. If decoding the field is not needed to further process the message, the field may not be decoded. Decoding thus can be delayed until the value of field is needed (e.g., decoding may be performed in response to a user request asking for the field to be displayed).

Traditionally, when a new protocol is developed that is based on an existing protocol, the existing protocol parser has to be modified. For example, when a new protocol based on Ethernet is introduced, the Ethernet parser is modified to recognize messages in the new protocol and pass the message to a new protocol parser created to parse the message in the new protocol. Similarly, the IP protocol describes a field that is an integer that is used to indicate different IP-based protocols. If a new IP-based protocol is created, an unused integer is selected to indicate the new protocol and the IP protocol parser has to be changed. In contrast, in accordance with aspects of the subject matter described herein, an IP communication analyzer receives a message in a protocol that is based on the IP protocol, processes the message in accordance with the IP protocol rules. If the message does not violate any IP protocol rules, the message is passed on with an indication that the message is a correct IP message. Any party can build on top of the IP protocol by indicating how a completed IP protocol message meeting specified conditions is to be further processed by a new protocol parser, creating a contract between the protocols and allowing an extension to be made without having to modify existing parsers.

It will be appreciated that although described within the context of protocols the concepts provided herein apply to any interaction pattern. For example, the communication interaction can take place between two components in the same process executing on a computing device. The communication interaction can take place between layers in a stack. The communication interaction can take place between hardware or software components of a computing device. For example, a USB device can generate events associated with fields having particular values. A model can be defined for the USB communication interaction that examines certain constraint conditions for the values.

Aspects of the subject matter described herein can be implemented using logical queues for endpoints. Logical queues can be used to pass layered messages. Each communication that is intercepted is intercepted at some point which can be modeled. For example, a message can be intercepted at an Ethernet port and may be headed to another Ethernet port. A representation of the message can be placed in a queue for Ethernet messages. A queue may be allocated for each endpoint. A representation of the message can be placed in a sender's queue. The sender model processor can retrieve the message, ascertain that it is an Ethernet message and process it in accordance with the Ethernet protocol model. Layered on top of the Ethernet layer is the IP layer. Layered on top of the IP layer is the TCP layer. Layered on top of the TCP layer the HTTP layer. Each layer is associated with a model with distinct processing patterns. As the Ethernet message processing is completed, the message can be sent on to the IP layer for IP processing.

Simulation processing of layered protocols can be implemented using objects. An object can be created. The message can be sent to the object. A centralized queue can be used to represent multiple logical queues, recognizing that the objects used are uniform in shape.

Pattern matching can be implemented using a finite state machine. Use of a finite state machine can enable efficient processing and parallel processing. Known protocol parsers start form a known point at the Ethernet layer and work their way up through the different layers of protocols. Some of the protocol layers can be encrypted. Typically encryption can make semantic analysis difficult because the encrypted data is not able to be decrypted. In accordance with aspects of the subject matter described herein, because of the contracts between the protocol layers, analysis can begin at any message at any layer. Hence encrypted layers can be avoided. Reassembly of packets can be avoided. The number of messages to be analyzed can be reduced logarithmically.

Figure 1B:
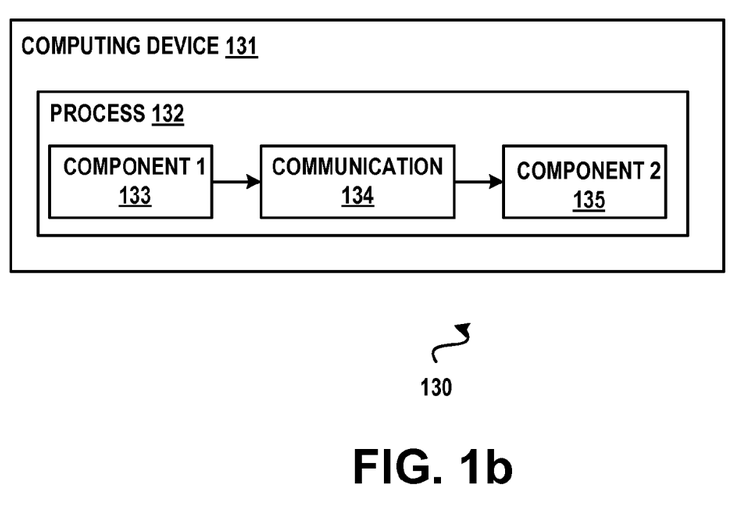
FIG. 1b is a block diagram that illustrates an example of sending and receiving entities in accordance with aspects of the subject matter described herein.

FIG. 1b is a block diagram that illustrates an example of sending and receiving entities in accordance with aspects of the subject matter described herein. FIG. 1b illustrates an example of a system 130 showing an intra-process communication between entities comprising components executing within a process on a computing device such as computing device 131. A process such as process 132 can be executing on computing device 131. Process 132 can include one or more components such as component 1 133, a sending component that sends a communication such as communication 134 to receiving component such as receiving component 135. It will be appreciated that component 133 can also be a receiving component and component 135 can also be a sending component.

Figure 1C:
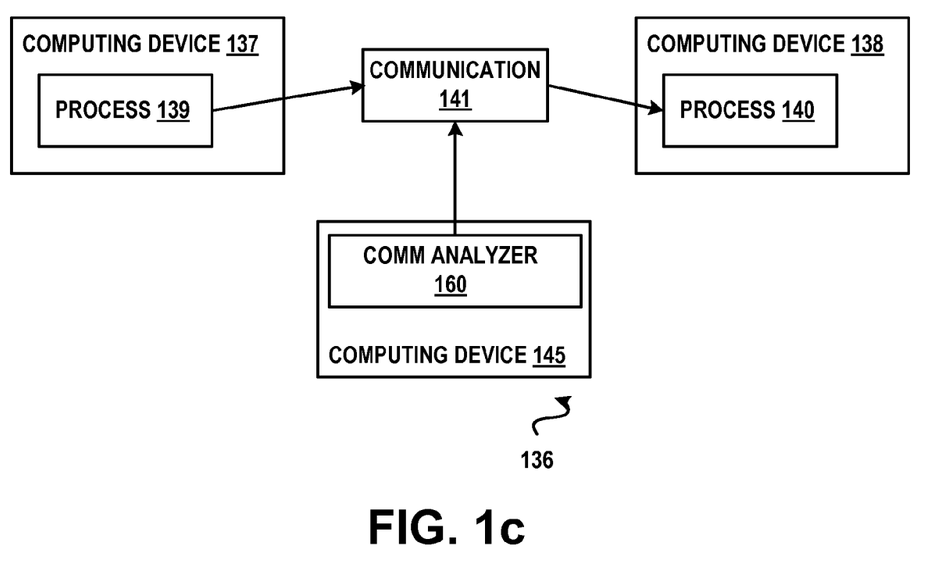
FIG. 1c is a block diagram that illustrates another example of sending and receiving entities in accordance with aspects of the subject matter described herein.

FIG. 1c is a block diagram that illustrates an example of sending and receiving entities in accordance with aspects of the subject matter described herein. FIG. 1c illustrates an example of a system 136 showing an inter-process communication between entities comprising processes, where a first process executes on a first computing device and a second process executes on a second computing device. System 136 can include a first computing device such as computing device 137 and a second computing device such as computing device 138. A first process such as process 139 can be executing on computing device 137 and a second process such as process 140 can be executing on computing device 138. Process 139 can be a sending process that sends a communication such as communication 141 to process 140, a receiving process. It will be appreciated that process 139 can also be a receiving process and process 140 can also be a sending process. System 136 can also include a third computing device such as computing device 145 that intercepts a communication such as communication 141 sent by computing device 137 to computing device 138. Computing device 145 can include a communication analyzer such as the communication analyzer described above that analyzes communication 141.

Figure 1D:
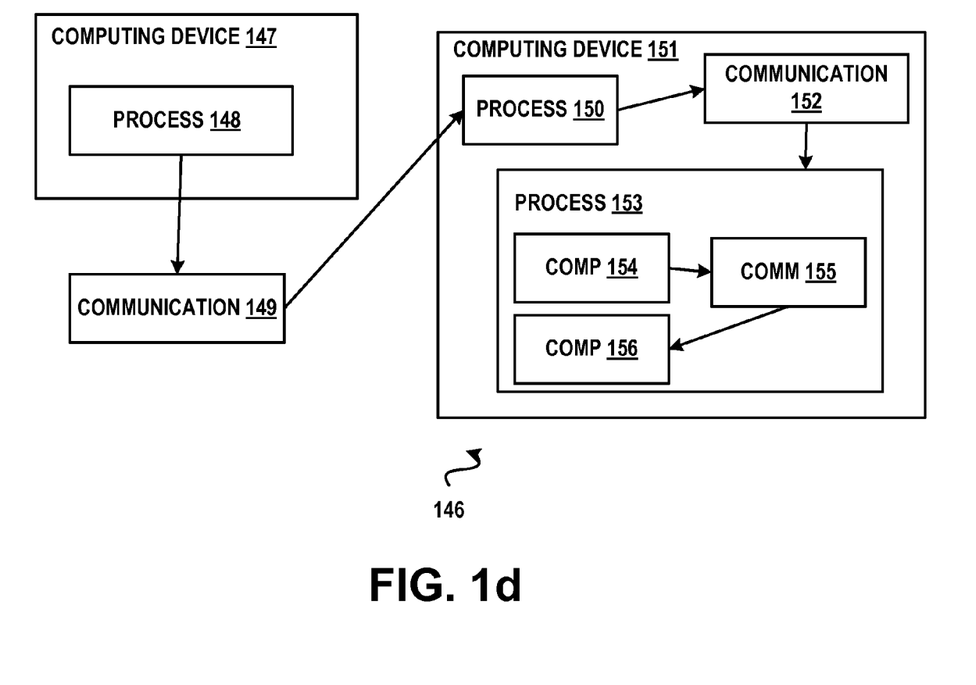
FIG. 1d is a block diagram that illustrates yet another example of sending and receiving entities in accordance with aspects of the subject matter described herein.

FIG. 1d is a block diagram that illustrates an example of sending and receiving entities in accordance with aspects of the subject matter described herein. FIG. 1d illustrates an example of a system 146 showing both an inter-process communication between entities comprising computing devices on a network and inter- and intra-process communications on a single computing device. System 146 can include a first computing device such as computing device 147 running a first process such as process 148. Process 148 can be a sending process that sends a communication such as communication 149 to a second process that receives the communication 149 such as process 150 executing on a second computing device such as computing device 151. Process 150 can sent a second communication such as communication 152 to another process such as process 153 executing on computing device 151. A component such as component 154 in process 153 can send another communication such as communication 155 to another component such as component 156 executing in process 153. As an illustrative but non-limiting example, process 148 can be a process that opens a file, process 150 can be a file server. Process 153 can represent a data storage process, component 154 can represent a file service and component 156 can represent a USB engine.

Figure 2:
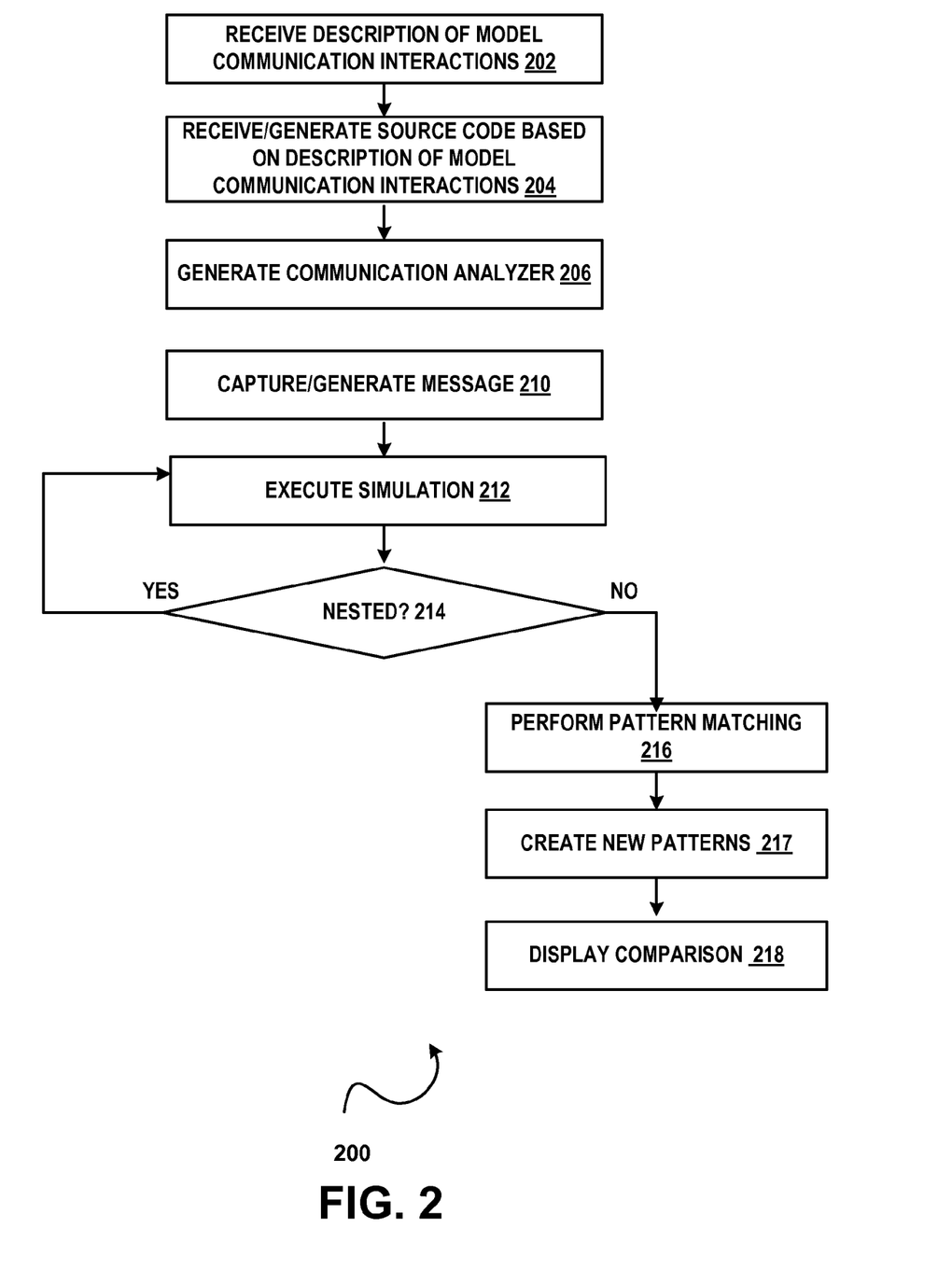
FIG. 2 is a flow diagram that illustrates an example of a method 200 that analyzes communications in accordance with aspects of the subject matter disclosed herein.

FIG. 2 illustrates an example of a method 200 that analyzes communications in accordance with aspects of the subject matter disclosed herein. The method described in FIG. 2 can be practiced by a system such as but not limited to the one described with respect to FIG. 1. While method 200 describes a series of operations that are performed in a sequence, it is to be understood that method 200 is not limited by the order of the sequence. For instance, some operations may occur in a different order than that described. In addition, one operation may occur concurrently with another operation. In some instances, not all operations described are performed.

At operation 202 a description of model communication interactions such as but not limited to a description of a protocol can be received or deduced. At operation 204 source code can be provided to a communication analyzer generator, the source code based on the description of model communication interactions. At 206 the source code can be used to generate a communication analyzer that can create a simulation of a communication system. Static analysis of the model communication interactions can be performed. At 210 the communication analyzer can receive or generate a communication. At 212 a logical endpoint for the communication can be determined from where the communication was intercepted. Simulation processing can be performed on the communication. The format and semantics of the communication can be validated. The communication interaction can be compared to model communication interaction. Diagnostic information and/or results of the comparison or other information about the communication and entities of the communication system can be generated. At operation 214 it can be determined if the communication is nested. In response to determining that the communication is nested, (e.g., the communication is an Ethernet message the Ethernet message including an IP message that includes a TCP message, etc.) processing can repeatedly return to operation 212 until all the layers of the nested message are processed. At operation 216 which may be performed simultaneously with validation processing, etc., pattern matching can be performed at operation. At 217 patterns of messages or events across different communication sources, components, protocols, etc., can be recursively combined to create new "virtual messages" or "operations". At 218 diagnostic or other information associated with a communication or groups of communications can be provided (e.g., on a display device, printer, etc.).

Example of a Suitable Computing Environment

Figure 3:
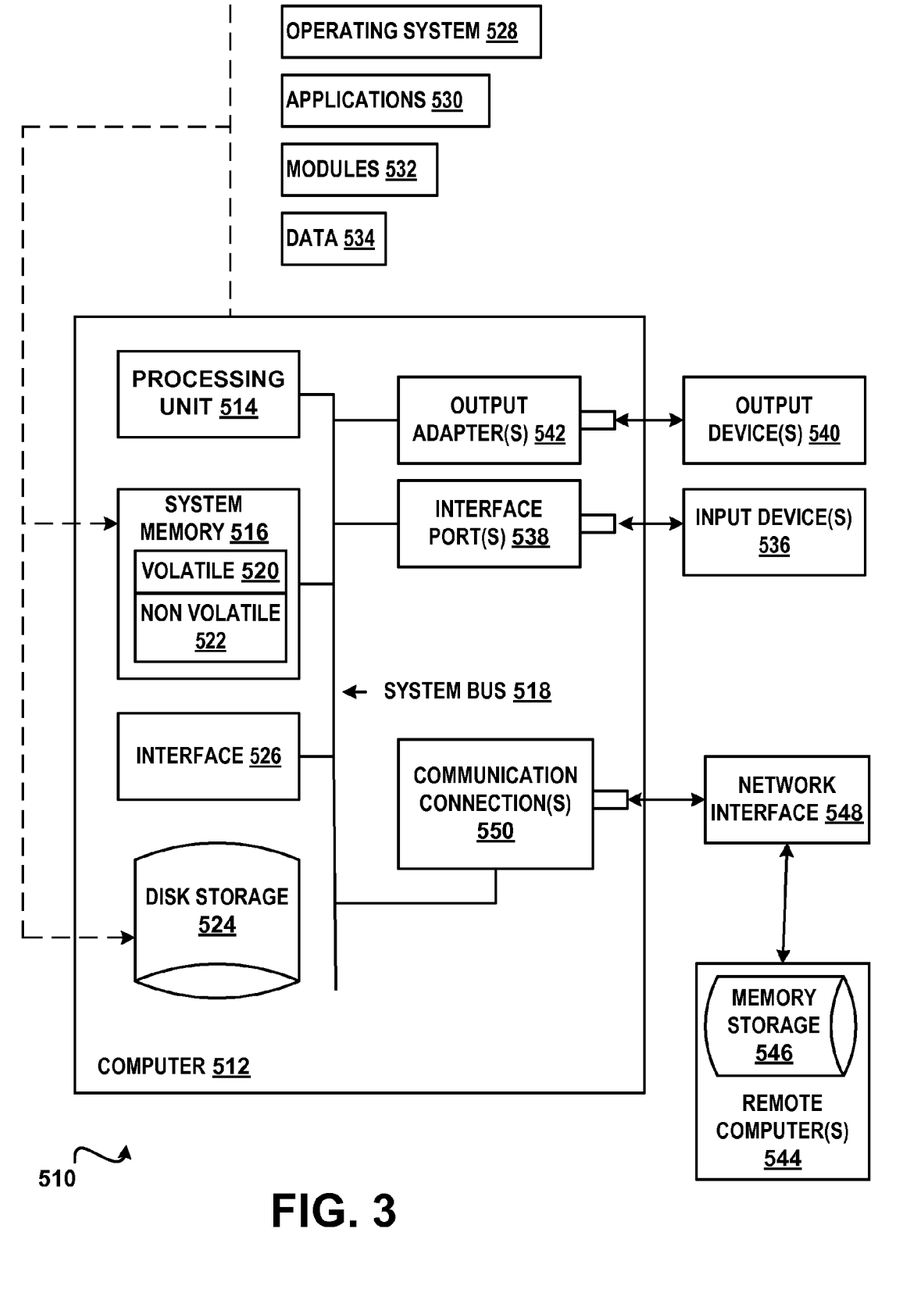
FIG. 3 is a block diagram of an example of a computing environment in accordance with aspects of the subject matter disclosed herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above. Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include executable instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
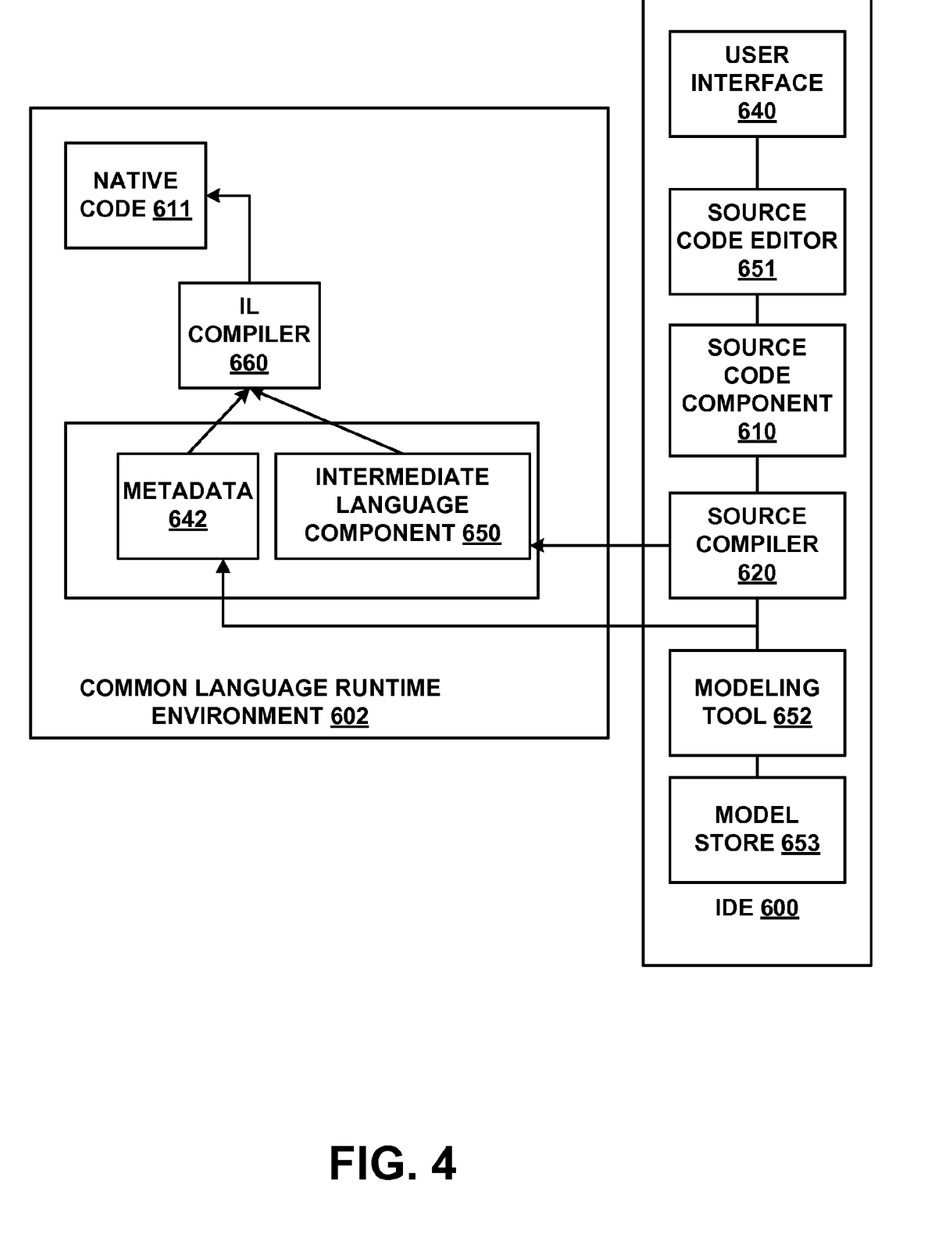
FIG. 4 is a block diagram of an example of an integrated development environment (IDE) in accordance with aspects of the subject matter disclosed herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the Microsoft.NET™ framework. An intermediate language component 650 may be created from the source code component 610 and the native code component 611 using a language specific source compiler 620 using a modeling tool 652 and model store 653 and the native code component 611 (e.g., machine executable instructions) is created from the intermediate language component 650 using the intermediate language compiler 660 (e.g. just-in-time (JIT) compiler), when the application is executed. That is, when an intermediate language (IL) application is executed, it is compiled while being executed into the appropriate machine language for the platform it is being executed on, thereby making code portable across several platforms. Alternatively, in other embodiments, programs may be compiled to native code machine language (not shown) appropriate for its intended platform.

A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable storage medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system comprising:
   at least one processor;
   a memory connected to the at least one processor,
   the memory comprising computer-executable instructions, which, when executed by the at least one processor, cause the system to:
      receive a description of model communication interactions between entities via source code written in a domain-specific language;
      generate, with the source code, a communication analyzer that compares communication interactions between the entities with the model communication interactions by:
         creating a simulation derived from a description of the model communication interactions between the entities, the simulation simulating processing within a communications system creating patterns for pattern matching by applying sequencing rules specified within the model communication interactions to a sequence of communications; and validating semantics of a communication between the entities; and extend the communication analyzer by creating derivatives of objects of the communication analyzer;

wherein the communication interactions include at least one message associated with a protocol; and wherein the entities are associated with network endpoints of the at least one message.

2. The system of claim 1, wherein the memory comprises further computer-executable instructions, which, when executed by the at least one processor, cause the computing device to perform static analysis on the model communication interactions, the model communication interactions defining state, state processing, state transitions or constraints of the communications system.

3. The system of claim 1, wherein the memory comprises further computer-executable instructions, which, when executed by the at least one processor, cause the computing device to provide diagnostic information by matching a sequence of communication interactions to a defined set of patterns.

4. The chassis of claim 1, wherein an entity comprises a software component, an endpoint for communications in a network, a party communicating over a virtual bus, a party communicating over a virtual network or a party using a shared memory.

5. The system of claim 1, wherein the created derivatives of the objects of the communication analyzer are based on patterns that are separate from the received description of the model communication interactions.

6. The system of claim 1, wherein the communication analyzer also performs static analysis on the model communication interactions.

7. A method comprising:

receiving source code written in a domain-specific programming language at a processor of a computing device, the source code describing model communication interactions in a communications system;

generating a communication analyzer that compares communication interactions between entities with the model communication interactions by:

simulating processing of the communications system, the communications system modeled by the model communication interactions;

creating patterns for pattern matching by applying sequencing rules specified within the model communication interactions to a sequence of communications; and validating semantics of a communication between the entities, the communication interactions including at least one message associated with a protocol, the entities associated with network endpoints of the at least one message;

extending the communication analyzer by creating derivatives of objects of the communication analyzer; and displaying results of the communication analyzer on a display device of the computing device.

8. The method of claim 7, further comprising:
performing static analysis on the model communication interactions.

9. The method of claim 7, wherein the communication comprises a message associated with a layered network protocol.

10. The method of claim 9, wherein entities comprise endpoints on a network, endpoints of a virtual machine or endpoints on a virtual bus.

11. The method of claim 7, further comprising;
repeatedly processing the communication by providing the communication to a next layer of a layered protocol.

12. The method of claim 7, wherein the created derivatives of the objects of the communication analyzer are based on patterns that are separate from the received description of the model communication interactions.

13. A device, comprising:

at least one processor and a memory; the at least one processor configured to:

diagnose errors in at least one communication of a communication system, the communication associated with a layered protocol, diagnosing the errors by:

generating a communication analyzer from source code in a domain-specific language that describes model communication interactions between entities, the model communication interactions including at least one message associated with a protocol, the entities associated with network endpoints of the at least one message;

upon receiving the at least one communication at the communication analyzer, validating a format and semantics of the at least one communication by comparing the format and semantics of the at least one communication with model communication interactions;

pattern matching the at least one communication by comparing sequences of values in the at least one communication with valid and invalid sequences described in the model communication interactions; and extending the communication analyzer by creating derivatives of objects of the communication analyzer; and in response to determining that the at least one communication does not comply with the model communication interactions, displaying diagnostic information.

14. The device of claim 13, wherein the at least one processor is further configured to:
perform static analysis on the model communication interactions.

15. The device of claim 14, wherein the at least one processor is further configured to:
create a simulation of a receiver of the at least one communication.

16. The device of claim 15, wherein the at least one processor is further configured to:
adjusting state in the simulation of the sender in response to simulating sending the at least one communication.

17. The device of claim 15, wherein the at least one processor is further configured to:
adjust state in the simulation of the receiver in response to simulating receiving the at least one communication.

18. The device of claim 13, wherein the at least one processor is further configured to:
create a simulation of a sender of the at least one communication.

19. The device of claim 13, wherein the at least one processor is further configured to:
automatically send the at least one communication to a next layer in the layered protocol.

20. The device of claim 13, wherein the created derivatives of the objects of the communication analyzer are based on patterns that are separate from the received description of the model communication interactions.

* * * * *